(12) United States Patent
Fu et al.

(10) Patent No.: US 10,628,130 B2
(45) Date of Patent: *Apr. 21, 2020

(54) CODE COMPLETION OF CUSTOM CLASSES WITH MACHINE LEARNING

(71) Applicant: MICROSOFT TECHNOLOGY LICENSING, LLC., Redmond, WA (US)

(72) Inventors: Shengyu Fu, Redmond, WA (US); Neelakantan Sundaresan, Bellevue, WA (US); Ying Zhao, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/207,952

(22) Filed: Dec. 3, 2018

(65) Prior Publication Data
US 2019/0303108 A1    Oct. 3, 2019

Related U.S. Application Data

(63) Continuation-in-part of application No. 15/939,742, filed on Mar. 29, 2018.

(51) Int. Cl.
*G06F 9/44*    (2018.01)
*G06F 8/33*    (2018.01)
(Continued)

(52) U.S. Cl.
CPC ............... *G06F 8/33* (2013.01); *G06N 7/005* (2013.01); *G06N 20/00* (2019.01)

(58) Field of Classification Search
CPC ........... G06F 8/33; G06N 20/00; G06N 7/005
See application file for complete search history.

(56) References Cited

U.S. PATENT DOCUMENTS 7,171,352 B2 *   1/2007   Chang ....................... G06F 8/20
                                                         704/10
8,201,139 B2 *   6/2012   Chang ....................... G06F 8/20
                                                         704/2

(Continued)

OTHER PUBLICATIONS

Jianhua Li and Graeme Hirst, Semantic Knowledge in Word Completion, AC< 2005, retrieved online on Dec. 9, 2019, pp. 121-128. Retrieved from the Internet: <URL: http://delivery.acm.org/10.1145/1100000/1090809/p121-li.pdf?>. (Year: 2005).*

(Continued)

*Primary Examiner* — Hanh Thi-Minh Bui

(57) ABSTRACT

A code completion tool uses machine learning models generated for custom or proprietary classes associated with a custom library of classes of a programming language and for overlapping classes associated with a standard library of classes for the programming language. The machine learning models are trained with features from usage patterns of the custom classes and overlapping classes found in two different sources of training data. An n-order Markov chain model is trained for each custom class and each overlapping class from the usage patterns to generate probabilities to predict a method invocation more likely to follow a sequence of method invocations for a custom class and for an overlapping class.

18 Claims, 10 Drawing Sheets

(51) Int. Cl.
*G06N 7/00* (2006.01)
*G06N 20/00* (2019.01)

(56) References Cited

U.S. PATENT DOCUMENTS

2014/0208296 A1   7/2014   Dang et al.
2018/0101771 A1*  4/2018   Schwarm .............. G06N 5/022
2019/0303109 A1   10/2019  Fu et al.

OTHER PUBLICATIONS

Agrawal, et al., "Mining Association Rules between Sets of Items in Large Databases", In Proceedings of the ACM SIGMOD Conference on Management of Data, May 25, 1993, 10 Pages.

Alnusair, et al., "Effective API Navigation and Reuse", In Proceedings of IEEE International Conference on Information Reuse and Integrations, Aug. 4, 2010, pp. 1-8.

Bruch, et al., "Learning from examples to improve code completion systems", In Proceedings of the 7th Joint Meeting of the European Software Engineering Conference and the ACM SIGSOFT Symposium on the Foundations of Software Engineering,, Aug. 23, 2009, 10 Pages.

Cergani, et al., "Addressing Scalability in API Method Call Analytics", In Proceedings of the 2nd International Workshop on Software Analytics. ACM, Nov. 13, 2016, 7 Pages.

Cover, et al., "Nearest Neighbor Pattern Classification", In Transactions on Information Theory, vol. 13, Issue 1, Jan. 1967, pp. 21-27.

D'Souza, et al., "Collective Intelligence for Smarter API Recommendations in Python", In 16th International Working Conference on Source Code Analysis and Manipulation (SCAM), Oct. 2-3, 2016, pp. 51-60.

Gvero, et al., "Complete Completion Using Types and Weights", In Proceedings of the 34th ACM SIGPLAN Conference on Programming Language Design and Implementation, Jun. 16, 2013, pp. 27-38.

Mandelin, et al., "Jungloid Mining: Helping to Navigate the API Jungle", In Proceedings of the ACM SIGPLAN conference on Programming language design and implementation, Jun. 12-15, 2005, 14 Pages.

Marasoiu, et al., "An Empirical Investigation of Code Completion Usage by Professional Software Developers", In Proceedings of 26th Annual Workshop on Psychology of Programming Interest Group. Jul. 15, 2015, 12 Pages.

Mobasher, et al., "Using Sequential and Non-Sequential Pattern in Predictive web Usage Mining Tasks*", In Proceedings of International Conference on Data Mining. Dec. 9, 2002, 4 Pages.

Murphy, et al., "How are Java Software Developers Using the Elipse IDE?", In Journal of IEEE Software, vol. 23, Issue 4, Jul. 17, 2006, pp. 76-83.

Perelman, et al., "Type Directed Completion of Partial Expressions", In Proceedings of the 33rd ACM SIGPLAN Conference on Programming Language Design and Implementation, Jun. 11, 2012, pp. 275-286.

Proksch, et al., "Intelligent Code Completion With Bayesian Network", In Transactions on Software Engineering and Methodology (TOSEM), vol. 25 Issue 1, Dec. 2015, 31 Pages.

Radev, "Evaluating Web-based Question Answering Systems", In Proceedings of the Third International Conference on Language Resources and Evaluation, May 29, 2002, 4 Pages.

Raychev, et al., "Code Completion With Statistical Language Models", In Proceedings of the 35th ACM SIGPLAN Conference on Programming Language Design and Implementation, Jun. 9, 2014, pp. 419-428.

Robillard, Martin P.., "What Makes APIs Hard to Learn? Answers from Developers", In Journal of IEEE Software, vol. 26, Issue 6, Nov. 2009, pp. 27-34.

Shani, et al., "An MDP-based Recommender System", In Journal of Machine Learning Research, Sep. 6, 2005, pp. 1265-1295.

Zhong, et al., "MAPO, Mining and Recommending API Usage Patterns", In Proceedings of the 23rd European Conference on Object-Oriented Programming, Jul. 6, 2009, 25 Pages.

Zimdars, et al., "Using Temporal Data for Making Recommendations", In Proceedings of the Seventeenth Conference on Uncertainty in Artificial Intelligence, Aug. 2, 2001, pp. 580-588.

"Final Office Action Issued in U.S. Appl. No. 15/939,742", dated Nov. 5, 2019, 26 Pages.

"International Search Report and Written Opinion Issued in PCT Application No. PCT/US19/013417", dated Apr. 4, 2019, 17 Pages.

Thummalapenta, et al., "Parseweb", In Proceedings of 22nd IEEE/ACM International Conference on Automated Software Engineering (ASE 2007), pp. 204-213.

* cited by examiner

```
12  private static void DirectoryCopy(string sourceDirName, string destDirName, bool copySubDirs)
13  {
14    DirectoryInfo dir = new DirectoryInfo(sourceDirName);
15
16    if (!dir.|
```

[504] Exists

*FIG. 5A*

```
12  private static void DirectoryCopy(string sourceDirName, string destDirName, bool copySubDirs)
13  {
14    DirectoryInfo dir = new DirectoryInfo(sourceDirName);
15
16    if (!dir.|
```

[508]
* Exists
Attributes
Create
CreateSubDirectory
CreationTime
CreationTimeUtc
Delete

*FIG. 5B*

CODE COMPLETION OF CUSTOM CLASSES WITH MACHINE LEARNING

CROSS-REFERENCE TO RELATED APPLICATIONS

The present application is a continuation-in-part of U.S. patent application Ser. No. 15/939,742, filed on Mar. 29, 2018.

BACKGROUND

Software development environments are often used to aid software developers (i.e., users, programmers, etc.) to develop program code. The software development environment may include a source code editor and other tools that the developers utilize to write and test their programs. Some software development environments provide assistance for the developer to write code by automatically presenting a list of possible candidates based on one or more characters (e.g., letters, symbols, etc.) that a developer has typed into a source code editor. A popup menu may appear with several suggested code elements, phrases, or entities that the developer may utilize. This assistance is beneficial since it speeds up the development time and reduces common errors, such as typos. However, the automatic code completion feature may be problematic when there is a large list of candidates which may not be relevant and/or which may be too lengthy for a developer to browse through to find the right element.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A code completion tool utilizes sequential machine learning models to predict more accurately those methods more likely to complete a method invocation. The machine learning models are trained on usage patterns found in commonly-used source code programs. The usage patterns are detected from the characteristics of the context in which a method invocation is used in a program. These characteristics are extracted from data structures representing the syntactic structure and semantic model representations of a program. A machine learning model is generated for each class and contains ordered sequences of method invocations with probabilities representing the likelihood of a transition from a particular method invocation sequence to a succeeding method invocation. In one aspect, the machine learning model is an n-order Markov chain model which is used to predict what method will be used in a current invocation based on preceding method invocations of the same class in the same document and the context in which the current method invocation is made.

During code development, an autocompletion component of a source code editor uses the sequential machine learning models to generate candidates to complete a method invocation. The machine learning model uses one or more immediately preceding method invocations and the characteristics of the context of the current position to predict the more likely methods to complete a method invocation.

In a second aspect, custom machine learning models are generated for proprietary or custom classes not found in a standard library associated with a standard specification of a programming language. The custom classes may be used in a source code program along with other classes that are part of a standard library of the programming language, otherwise referred to as overlapping classes. Machine learning models are also generated for each of the overlapping classes. The custom and overlapping machine learning models are used in the code completion system for the code completion system to recognize the methods of a custom class.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIGS. 5A-5B illustrate exemplary pop-up windows including code completion candidates.

DETAILED DESCRIPTION

Overview

Figure 1:
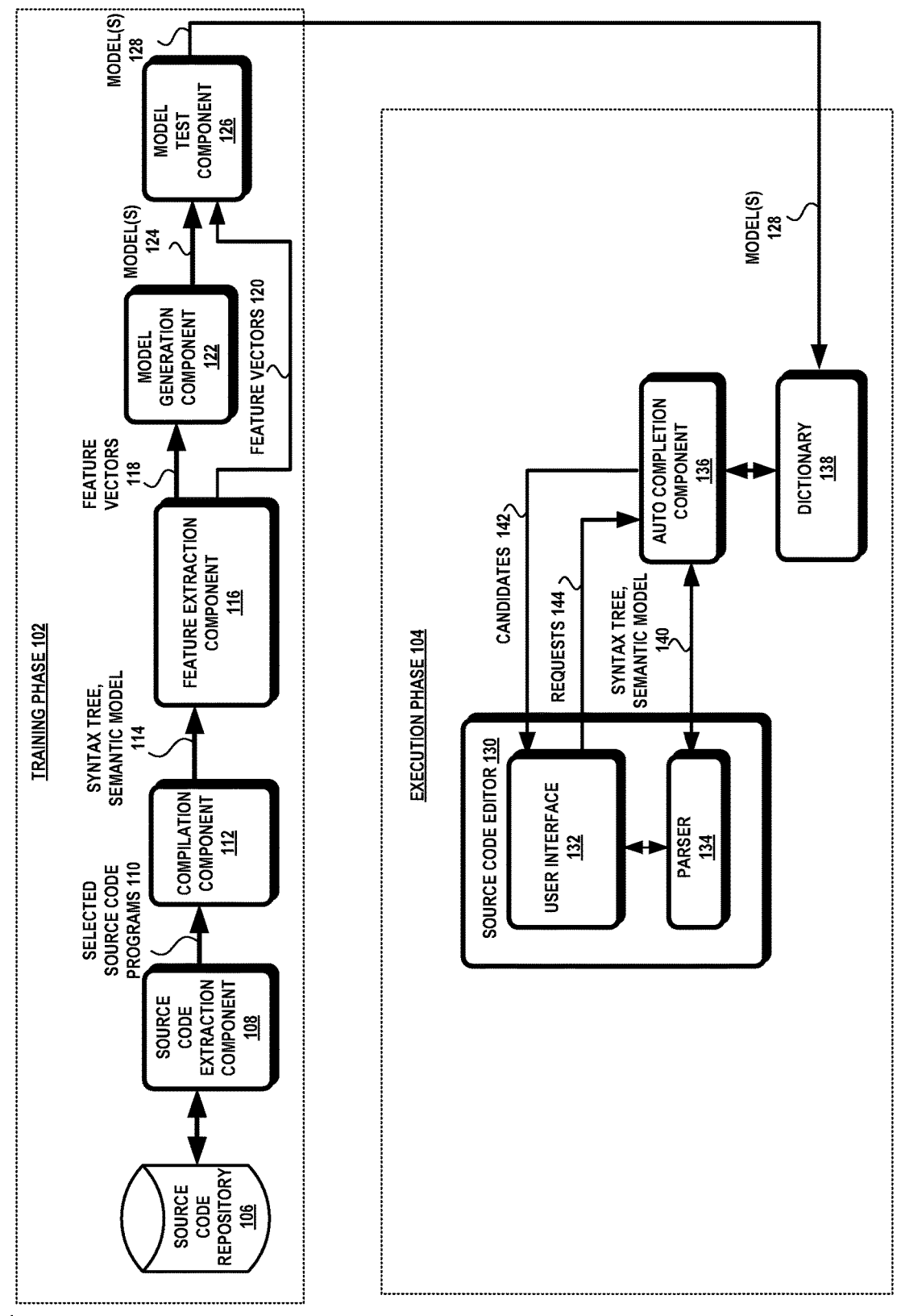
FIG. 1 illustrates an exemplary system including a training phase used to generate machine learning models for code completion and an execution phase that uses the machine learning models for code completion.

The subject matter disclosed pertains to a mechanism for generating candidates for code completion or autocompletion of a method invocation. A method invocation is the issuance of a call to a method or property of a class. A class may include a large number of methods and/or properties thereby making it impractical to list all the methods and properties of a class as candidates. In order to generate candidates more likely to complete a source code statement invoking a method, the context in which the method is invoked is used to predict the more likely candidates.

Method invocations differ with respect to the context in which they are used in a program. The context of a method invocation may include one or more of the following: the spatial position of the method call in the program; whether the method call is inside a conditional branch (e.g., if-then-else program construct); the name of the class; the name of the method or property invoked; the name of the class corresponding to the invoked method; the function containing the method invocation; the type of the method; and an indication if the method is associated with an override, static, virtual, definition, abstract, and/or sealed keyword. This context information is collected from various programs and used to detect sequential patterns in the method invocations of a class. The context information is used as the features that train a machine learning model to predict the next method to complete a method invocation.

In one aspect, an n-order Markov chain model is generated based on the context information extracted from method invocations found in various programs written in a specific programming language. Markov chain models are used in code completion to predict what method will be used in a current invocation based on preceding method invocations of the same class in the same document and the context in which the current method invocation is made.

There are various versions of a programming language with each version based on a standard associated with the language. The standard is based on a specification supported by a community that oversees the development of the language (e.g., International Standard Organization (ISO)). The standard also has a standard library that is a collection of classes and functions that are supported by the particular version of the programming language. Classes that are associated with a standardized version of a programming language are referred to herein as the standard classes.

Developers may create their own classes which are not part of a standard library and these classes are referred to as custom classes. Source code programs may contain method invocations from both the custom classes and the standard classes. The method invocations of the standard classes found in source code programs using custom classes is referred to as overlapping classes since they are contained in the standard library and the custom library.

An n-order Markov chain model is generated for each custom class and for each overlapping class. The models are based on the frequency of the sequential usage patterns found in the training data. The custom classes are likely to have less training data than the standard classes resulting in the overlapping classes being oversampled.

In order to account for the differences in the amounts of each type of training data, the probability associated with the overlapping classes is based on a combined frequency of two types of training data: programs using the custom classes and programs not using the custom classes. The frequency of an overlapping class used in programs having custom classes is adjusted by an oversample ratio. The custom and overlapping models are used in the code completion system for an application that utilizes custom classes.

Attention now turns to a further discussion of the system, devices, components, and methods utilized in a code completion system.

Machine Learning Code Completion System

FIG. 1 illustrates a block diagram of an exemplary system 100 in which various aspects of the invention may be practiced. As shown in FIG. 1, system 100 includes a training phase 102 which generates a model for each class and an execution phase 104 that utilizes the class models in a code completion system. The training phase 102 may utilize a source code extraction component 108, a compilation component 112, a feature extraction component 116, a model generation component 122 and a model test component 126. The execution phase 104 may utilize a source code editor 130, an auto completion component 136, and a dictionary 138.

In the training phase 102, the source code extraction component 108 extracts source code programs 110 from a source code repository 106 to train the machine learning models. A compilation component 112 compiles the selected source code programs 110 to generate a corresponding syntax tree and semantic model 114. In one aspect, the compilation component 112 may be a front-end compiler, a parser, or a language compiler.

A syntax tree or abstract syntax tree represents the syntactic structure of the program in a hierarchical or tree structure. The syntax tree is a data structure that includes nodes that represent a construct in the grammar of the programming language of the program. The semantic model includes all the semantic information about the program. The semantic model includes information on the symbols referenced at a specific location in the program. Every namespace, type, method, property, field, event, parameter, label, and local variable maybe represented by a symbol. Symbols may also include additional information that a compiler determines from the program, such as methods and properties associated with the symbol. The semantic model encapsulates all this data into a data structure referred to as the semantic model.

The syntax tree and the semantic model 114 of each selected source code program is passed to the feature extraction component 116. The feature extraction component 116 extracts certain features of a method invocation from the syntax tree and semantic model. A feature is a discriminable characteristic of the method invocation that represents the context in which a method is called. There are several features extracted for each method invocation and these features comprise a feature vector. A portion of the feature vectors generated for a particular class can then be used as training data for the model generation component 112 to train a model 118. Another portion of the feature vectors 120 can be used by the model test component 126 to test the model 120.

In one aspect, the features may include one or more of the following: the position of a method invocation within the program (e.g., span start); whether the method invocation is within a conditional branch (e.g., if-then-else statement, switch or case statement); the class name corresponding to the method invocation, the name of the method or property invoked; the name of the class that contains the called method; the function that contains the called method; the type of the method; and an indication of whether the called method is associated with the static, virtual, override, definition, abstract and/or sealed keywords.

The models 128 may then be used in code completion. The execution phase 104 may include a source code editor 130 having a user interface 132 and a parser 134, an auto completion component 136, and one or more dictionaries 138. In one or more aspects, code completion may be a function or feature integrated into a source code editor and/or integrated development environment (IDE). Code completion may be embodied as a tool or feature that can be an add-on, plug-in, extension and/or component of a source code editor and/or IDE.

In one aspect, a source code editor 130 may include a user interface 132 and a parser 134. The user interface 132 includes a set of features or functions for writing and editing a source code program. The user interface 132 may utilize a pop-up window to present a list of possible candidates for completion thereby allowing a developer to browse through the candidates and to select one from the list. In this manner, code completion serves as documentation for the method invocations associated with a class in addition to being an assistance to writing code quickly. The parser 134 reads the source code in the source code editor 130 and generates a corresponding syntax tree and semantic model 140. The parser 134 also updates the syntax tree and semantic model 140 as the developer creates and edits the source code in the source code editor 130.

At certain points in the editing process, the user interface 132 will detect that the user has entered a particular character which will initiate code completion. In one aspect, the character that initiates code completion may be a period, ".", placed after a class name. The user interface 132 will then request candidates from the auto completion component 136 to present to the developer.

The auto completion component 136 receives requests 144 for candidates to complete a method invocation. The auto completion component 136 extracts the previous method invocations for the same class in the same document used in the current invocation and the context of the current invocation by accessing the syntax tree and semantic model representation of the source code program in the source code editor.

The auto completion component 136 utilizes one or more dictionaries 138 which contain the models 128 in a lookup table format. There is one model for each class. A dictionary 138 corresponding to the class name is accessed based on a sequence of method invocations. The corresponding entry has a list of methods ranked by their predicted probabilities. The auto completion component 136 obtains one or more candidates 142 from the dictionary 138 which are returned back to the user interface 132. In one aspect, at most five candidates are obtained from the dictionary 138. The user interface 132 in turn provides the candidates to the developer. In one aspect, the user interface 132 may provide the candidates from the auto completion component with other candidates from other code completion tools and/or provide the candidates from the machine learning based auto completion component separately. The techniques describe herein are not constrained to any particular mechanism for providing the candidates to a developer and the manner in which the candidates are displayed to the user (e.g., pop-up window, etc.).

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. For example, the training phase 102 may be executed in one computing environment and the execution phase 104 may be executed in the same computing environment or in a separate computing environment. The various computing environment is described in further detail below.

Figure 2A:
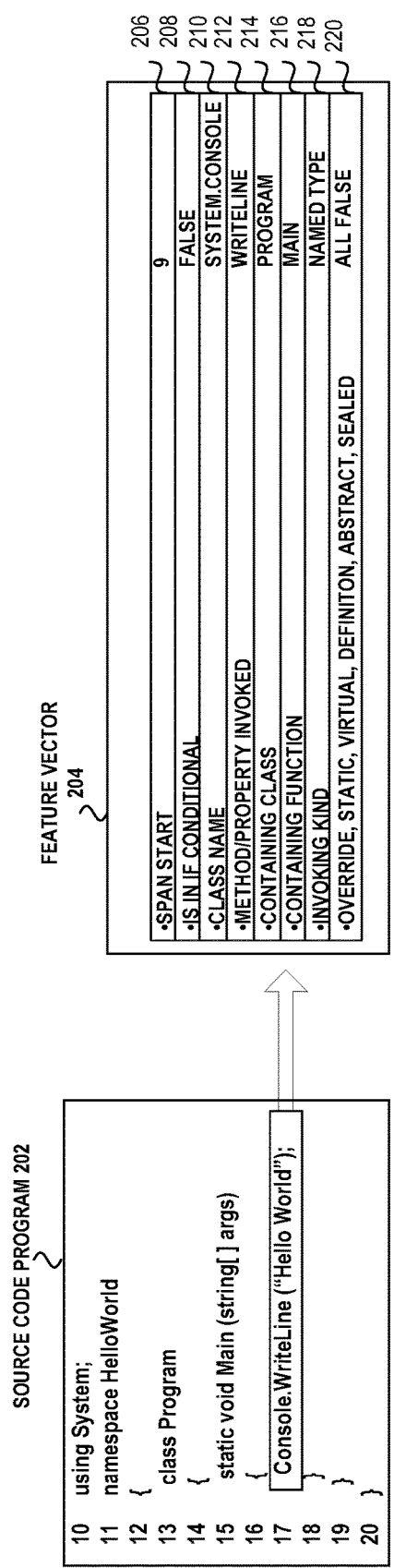
FIG. 2A is a schematic diagram illustrating the extraction of features from a source code program.

FIG. 2A illustrates the extraction of the features used to train a Markov chain model. Source code program 202 contains at line 17 an invocation of the method Console. Writeline( ). The Console.Writeline method is part of the System.Console class. The features that are extracted from this method invocation are placed into feature vector 204. Feature vector 204 includes the following features: span start=9 (206); if conditional=false (208); class name=System.Console (210); the name of the method=Writeline (212); the name of the class containing the method=Program (214); the name of the function containing the method invocation=Main (216); the type of the method=Named Type (218); and if the method is associated with the keywords override, static, virtual, definition, abstract, and sealed=False (220).

Feature vector 204 as well as other feature vectors associated with method invocations of the System.Console class are used to train a model to predict the most likely candidates to complete the method invocation. The model is a sequential or chain model that is capable of modeling sequences of events. In one aspect, the model is a Markov chain model. A Markov chain model relies on the assumption that each state is dependent on previous states. The dependency is given by a conditional probability $P(x_t|x_{t-1}, \ldots, x_{t-N})$, where $x_t$ is the state of the model at time t and n is the order of the Markov chain. In a first order Markov chain, a state is dependent only on the immediately preceding state and in a second order Markov chain model, a state is dependent on the immediately preceding two states.

The transition probabilities are generated from the sequential usage patterns detected in the training data. In one aspect, the probabilities may be computed as $P(x_t|x_{t-1}, \ldots, x_{t-n}) = N_t/N_{total}$, where n is the order of the Markov chain, $N_t$ is the number of times $x_t$ comes after $x_{t-1}$ and $x_{t-2}$, $N_{total}$=total number of methods that come after $x_{t-1}$ and $x_{t-2}$. Each model represents a particular class and contains sequences of method invocations that result in an end state that represents a method invocation within the class.

Figure 2B:
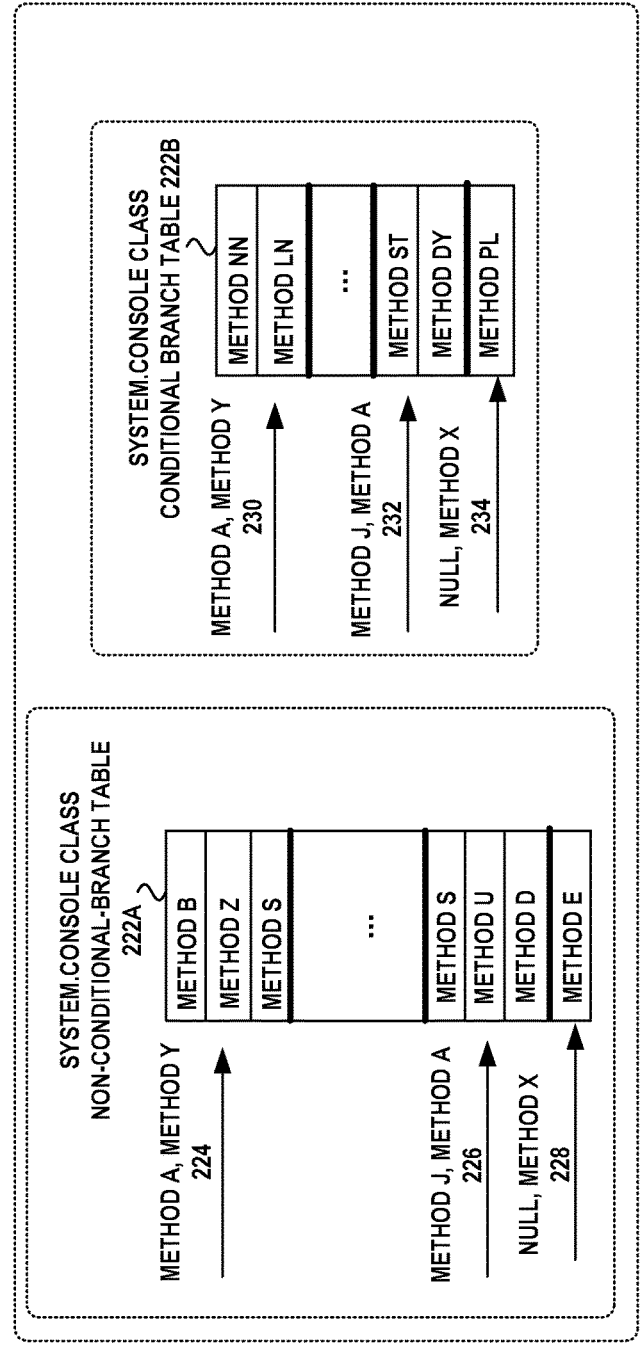
FIG. 2B illustrates an exemplary second-order Markov model embodied in a lookup table or dictionary format.

FIG. 2B illustrates an exemplary second order Markov chain model embodied as a lookup table (i.e., dictionary, key-value pair). In one aspect, there are at least two lookup tables for each class 222A,222B. One lookup table is for method invocations outside of a conditional branch 222A and the other lookup table is for method invocations within a conditional branch 222B. The key into either table is a method invocation sequence of two previous method invocations in the System.Console class. The corresponding entry in the table is a list of methods in the System.Console class ranked in order of highest probability for completing a current invocation.

As shown in FIG. 2B, when the sequence of preceding method invocations of the System.Console class are Method A followed by Method Y 224, the key into the table is the sequence Method A, Method Y. The corresponding entry in the table 222A lists the code completion candidates as Method B, Method Z, Method S, ordered in highest probability to lowest probability. Likewise, when the preceding method invocations of the System.Console class are Method J followed by Method A 226, the code completion candidates are Method S, Method U, and Method D. When there is only one preceding method invocation for a class in a document, a null value is used to represent the missing method invocation and the key is the method sequence NULL, Method X. The corresponding entry is Method E.

When the current invocation is inside a conditional branch (i.e., if-then-else statement), then the System. Console class conditional branch table 222B is used. The previous sequence of method invocations for the System.Console class in the same document is used as the key into this table. When the preceding sequence of method invocations is Method A followed by Method Y 224, then the code completion candidates are Method NN and Method LN, where Method NN has a higher probability then Method LN. Likewise, when the preceding sequence of method invocations is Method J followed by Method A 226, the code completion candidate is Method ST. When there is only one preceding method invocation, the key is the sequence NULL, Method X 228 and the candidate is Method PL.

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
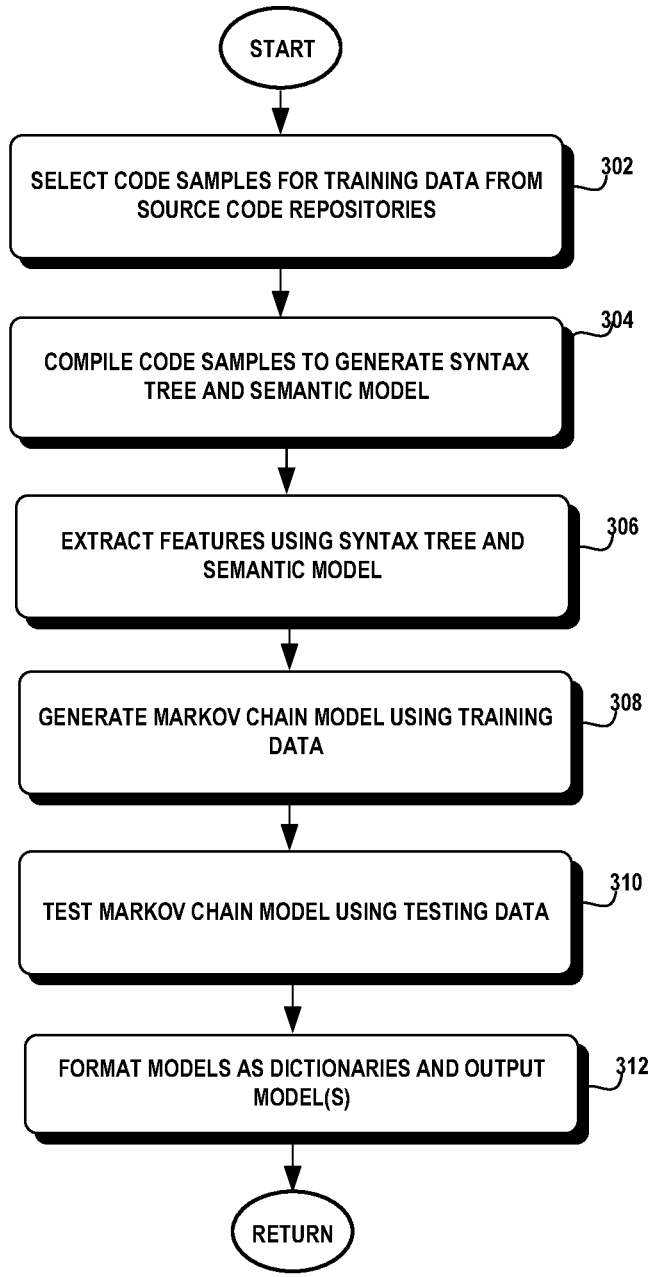
FIG. 3 is a flow diagram illustrating an exemplary method for generating the machine learning models.

FIG. 3 illustrates an exemplary method illustrating the generation of the machine learning models for code completion. Referring to FIGS. 1 and 3, one or more source code repositories 106 are searched for source code programs written in a target programming language. The source code repositories 106 can be widely-used code repositories, such as GitHub, internal code repositories, and/or combinations thereof. The source code extraction component 108 extracts a number and type of source code programs that meet an intended target, such as source code programs that are accessed frequently, source code programs that utilize a particular function (e.g., database operations, computer graphics programs, etc.), and the like (collectively, block 302).

The selected source code programs 110 are then compiled by the compilation component 112 to produce data structures representing the syntax tree and semantic model of the source code (block 304). The syntax tree and semantic model 114 are used by the feature extraction component 116 to extract characteristics representative of the context of a method invocation. These characteristics are used to determine the order in which methods are invoked in a program having conditional branches (block 306). The characteristics include one or more of the following: the position of a method invocation within the program (e.g., span start); whether the method invocation is within a conditional branch (e.g., if-then-else statement, switch or case statement); the class name corresponding to the method invocation, the name of the method or property invoked; the name of the class that contains the called method; the function that contains the called method; the type of the method; and an indication of whether the called method is associated with the static, virtual, override, definition, abstract and/or sealed keywords.

The characteristics are configured into feature vectors which serve as the training and testing data for the models. In one aspect, the feature vector can be split with 80% used as training data and 20% used as testing data (collectively, block 306).

The feature vectors in the training data are used by the model generation component to generate the models. The data in the feature vectors is used to determine an order of the method invocations in each program for each class. From the ordered list of method invocations, sequences of usage patterns can be detected. These patterns can then be partitioned into sequences having n+1 states, where n is the order of the Markov chain model. These sequences are then used to train a Markov chain model for each class which entails generating the states and transition probabilities (collectively, block 308).

The training data is analyzed to detect sequences of method invocations for each class. For an n-order Markov chain model, the number of specific n state method invocation sequences that occur is counted to order the n+1 states that occur thereafter by derived probabilities. The derived probability may be generated by the ratio of the number of times the n+1 state sequence occurs over the number of times the n state sequence occurs (block 308).

The models are then tested to ensure a target level of accuracy (block 310). The testing entails providing each model with test data and checking the recommendations that the model outputs. When the recommendations achieve a certain level of accuracy, then the models are transformed into a dictionary or lookup table format and released (block 312).

Figure 4:
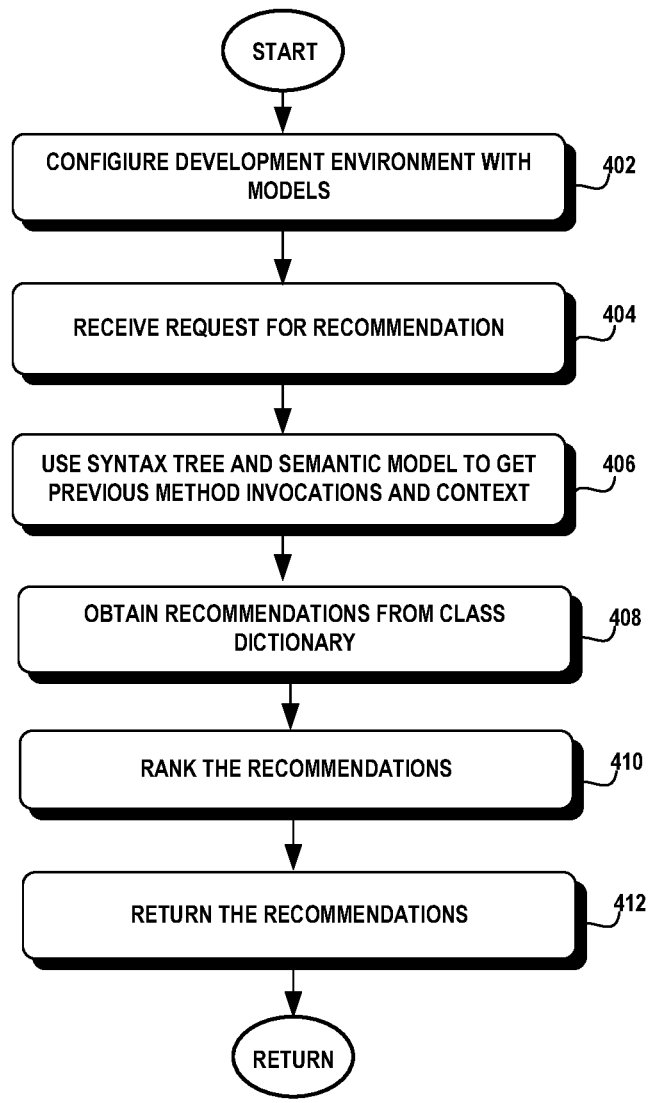
FIG. 4 is a flow diagram illustrating an exemplary method for utilizing the machine models for code completion.

FIG. 4 illustrates an exemplary method of code completion utilizing the machine learning models. Referring to FIGS. 1 and 4, code completion is performed in a development environment such as a source code editor 130. The source code editor 130 is configured to interact with an auto completion component 136 that utilizes the machine learning models in a lookup table format (block 402). The source code editor 130 performs a background parsing process that parses the source code in the source code editor to generate and update the syntax tree and semantic model of the source code (block 402).

The user interface 132 of the source code editor 130 detects the input characters that a developer enters into the source code editor 130. When the user interface 132 detects a particular character that denotes code completion is needed for a method invocation at a current position in the source code editor 130, the user interface 132 requests recommendations 144 from the auto completion component 136 (block 404). In one aspect, the detection of a period after a class name is used as the trigger to invoke code completion (block 404).

The auto completion component 138 utilizes the syntax tree and semantic model 140 generated during the source code editing session to obtain the previous method invocations that have occurred before the current position in the source code editor 130 and the characteristics of the context of the current method invocation, such as whether the current method invocation is inside a conditional branch (block 406). In one aspect, application program interfaces (APIs) may be used to extract the previous method invocations from the syntax tree and semantic model and the characteristics of the context of the current position (block 406).

The auto completion component 136 utilizes the dictionary 138 associated with the class to search for a sequence most likely to predict the next method invocation using the characteristics of the context of the current position (block 408). Once the auto completion component 136 obtains the previous method invocations, an n-state sequence can be constructed and used as a key to access the dictionary. The corresponding values are used as the recommendations. If there is no such n-state sequence, then the dictionary is searched using an n−1 state sequence constructed from the previous n−1 method invocations in the same class. If the n−1 state sequence cannot be found in the dictionary, then the n−2 state sequence is used to search the dictionary. In an n-order Markov chain model, the n−1 state sequence will be stored as a new n state sequence with the first state marked as null.

The auto completion component 136 may find one or more candidates for recommendation from the sequences in the dictionary (block 408). In the event that there are multiple candidates, the auto completion component 136 orders the recommendations by highest probability (block 410). The candidates are then returned to the user interface for display to the developer (block 412).

FIGS. 5A-5B illustrate exemplary user interfaces. FIG. 5A shows an exemplary source code program 502 in a source code editor that display pop-up window 504 containing candidates for code completion. As shown in FIG. 5A, the suggested method to complete the expression !dir. is the method Exists. FIG. 5B shows an exemplary source code program 506 in a source code editor that displays pop-up window 508 containing multiple recommendations. The recommendation from the auto completion component may be distinguished with a star * and other recommendations are included thereafter in alphabetical order.

Custom and Overlapping Classes

Figure 7:
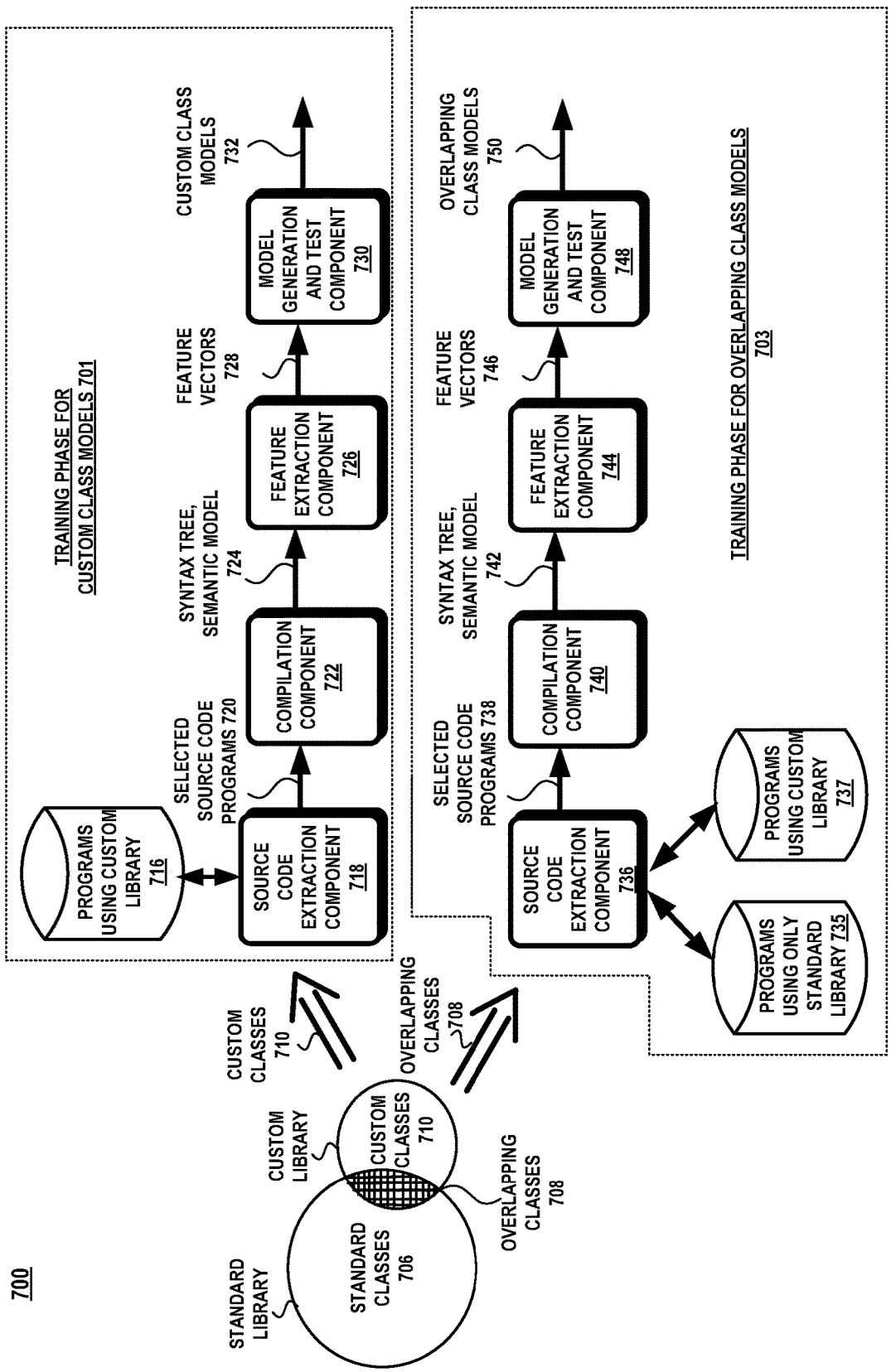
FIG. 7 illustrates a training phase of a second aspect of the code completion system which trains custom and overlapping machine learning models.

FIG. 7 illustrates a second aspect of the code completion system 700. In this aspect, the code completion system 700 customizes machine learning models to recognize custom classes and overlapping classes. A custom class is one that is not associated with a standard library or commonly-used library of the programming language. For example, an open source version of a programming language contains a standard library of commonly-used classes. These commonly-used classes are part of a standard library. A proprietary or custom library of the programming language may contain custom classes not found in the standard library. The custom library may also contain classes from the standard library. In order for the code completion system to recognize the custom classes, models are generated for the custom classes since they are likely to be used in a target application.

Turning to FIG. 7, there is a standard library 702 and a custom library 704 of classes for a programming language. The custom library 704 includes custom classes 710 and overlapping classes 708. The overlapping classes are part of the standard library 702 and part of the custom library 704. The custom classes 710 are not part of the standard library 702.

The system 700 includes a training phase 701 for the custom classes 710 and a training phase 703 for the overlapping classes 708. The training phase for the custom classes 701 uses a source code extraction component 718, a compilation component 722, a feature extraction component 726, and a model generation and test component 730. The source code extraction component 718 extracts source code programs 720 using the custom library 704 from a source code repository 716. A compilation component 722 compiles the selected source code programs 720 to generate a corresponding syntax tree and semantic model 724. The feature extraction component 726 extract features or training data from the selected source code programs 724 which are formatted into feature vectors 728. The model generation and test component 730 uses the feature vectors 728 to train a n-order Markov model for each custom class 732.

The training phase for the overlapping classes 703 uses a source code extraction component 736, a compilation component 740, a feature extraction component 744, and a model generation and test component 748. The source code extraction component 736 extracts source code programs 738 from two different source code repositories 735, 737. One source code repository 735 contains source code programs only using classes from the standard library and the other source code repository 737 contains source code programs using classes from the custom library and the standard library.

A compilation component 740 compiles the selected source code programs 738 to generate a corresponding syntax tree and semantic model 742. The syntax tree and the semantic model 742 of each selected source code program is passed to the feature extraction component 744. The feature extraction component 744 extracts certain features of a method invocation from the syntax tree and semantic model. A portion of the feature vectors 746 generated for a particular class can then be used as training data for the model generation and test component 748. Another portion of the feature vectors 746 can be used to test the overlapping class models 750.

A syntax tree or abstract syntax tree 724, 742 represents the syntactic structure of the program in a hierarchical or tree structure. The syntax tree is a data structure that includes nodes that represent a construct in the grammar of the programming language of the program. The semantic model includes all the semantic information about the program. The semantic model includes information on the symbols referenced at a specific location in the program. Every namespace, type, method, property, field, event, parameter, label, and local variable maybe represented by a symbol. Symbols may also include additional information that a compiler determines from the program, such as methods and properties associated with the symbol. The semantic model encapsulates all this data into a data structure referred to as the semantic model.

The syntax tree and the semantic model 724, 742 of each selected source code program is passed to the feature extraction component. The feature extraction component 726, 744 extracts certain features of a method invocation from the syntax tree and semantic model. A feature is a discriminable characteristic of the method invocation that represents the context in which a method is called. There are several features extracted for each method invocation and these features comprise a feature vector. A portion of the feature vectors generated for a particular class can then be used as training data for the model generation and test component 730, 748 and another portion of the feature vectors may be used to test the models.

In one aspect, the features may include one or more of the following: the position of a method invocation within the program (e.g., span start); whether the method invocation is within a conditional branch (e.g., if-then-else statement, switch or case statement); the class name corresponding to the method invocation, the name of the method or property invoked; the name of the class that contains the called method; the function that contains the called method; the type of the method; and an indication of whether the called method is associated with the static, virtual, override, definition, abstract and/or sealed keywords.

Figure 8:
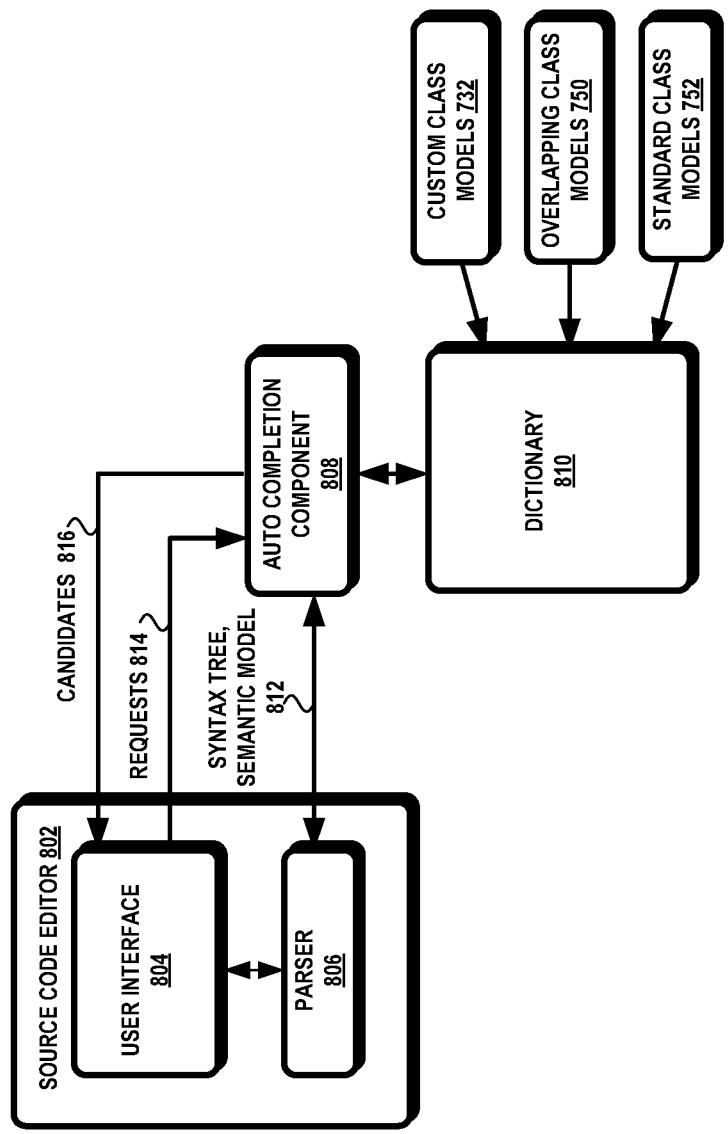
FIG. 8 illustrates an execution phase of the second aspect of the code completion system which uses the custom and overlapping machine learning models.

Turning to FIG. 8, the models 732, 750 may then be used for code completion. The execution phase 800 may include a source code editor 802 having a user interface 804 and a parser 806, an auto completion component 808, and one or more dictionaries 810. In one or more aspects, code completion may be a function or feature integrated into a source code editor and/or integrated development environment (IDE). Code completion may be embodied as a tool or feature that can be an add-on, plug-in, extension and/or component of a source code editor and/or IDE.

In one aspect, a source code editor 802 may include a user interface 804 and a parser 806. The user interface 804 includes a set of features or functions for writing and editing a source code program. The user interface 804 may utilize a pop-up window to present a list of possible candidates for completion thereby allowing a developer to browse through the candidates and to select one from the list. In this manner, code completion serves as documentation for the method invocations associated with a class in addition to being an assistance to writing code quickly. The parser 806 reads the source code in the source code editor 802 and generates a corresponding syntax tree and semantic model 812. The parser 806 also updates the syntax tree and semantic model 812 as the developer creates and edits the source code in the source code editor 802.

At certain points in the editing process, the user interface 804 will detect that the user has entered a particular character which will initiate code completion. The user interface 804 will then request candidates from the auto completion component 808 to present to the developer. The auto completion component 808 receives requests 814 for candidates to complete a method invocation. The auto completion component 808 extracts the previous method invocations for the same class in the same document used in the current invocation and the context of the current invocation by accessing the syntax tree and semantic model representation of the source code program in the source code editor.

The auto completion component 808 utilizes one or more dictionaries 810 which contain the models 732, 750 in a lookup table format. In one aspect, the custom class Markov models 732, and the overlapping class Markov model 750 are formatted into a dictionary for use in the code completion system. In other aspects, the code completion system may also utilize Markov models for classes of the standard library 752 which were generated as described above with respect to FIGS. 1-4.

There is one model for each class. A dictionary 810 corresponding to the class name is accessed based on a sequence of method invocations from that class. The corresponding entry has a list of methods ranked by their predicted probabilities. The auto completion component 808 obtains one or more candidates 816 from the dictionary 810 which are returned back to the user interface 804. The user interface 804 in turn provides the candidates to the developer. In one aspect, the user interface 804 may provide the candidates from the auto completion component with other candidates from other code completion tools and/or provide the candidates from the machine-learning based auto completion component separately. The techniques describe herein are not constrained to any particular mechanism for providing the candidates to a developer and the manner in which the candidates are displayed to the user (e.g., pop-up window, etc.).

Figure 9:
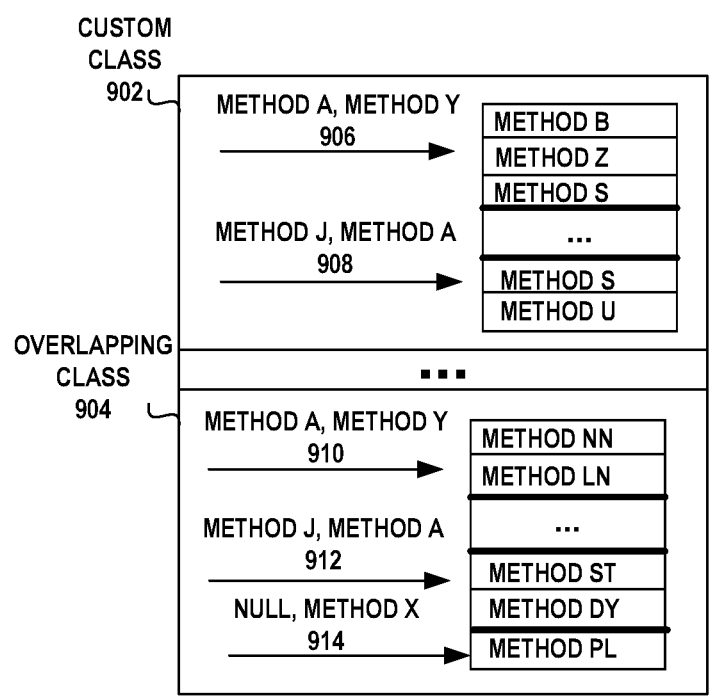
FIG. 9 is a schematic diagram illustrating exemplary second-order Markov models transformed into a dictionary to lookup method invocation sequences for the overloading and custom classes.

FIG. 9 illustrates exemplary second-order Markov chain models representing custom classes and overlapping classes embodied as several lookup tables or dictionaries 900 (i.e., key-value pairs). There is shown a dictionary for custom class 902 and a dictionary for overlapping class 904. The key into a dictionary is a method invocation sequence of two previous method invocations of a particular class. The corresponding entry in the dictionary is a list of methods in the particular class that are possible candidates to complete the method invocation ranked in order of highest probability for completing the method invocation.

As shown in FIG. 9, there is a dictionary for custom class 902. A key into this dictionary is a sequence of method invocations in custom class 902. For example, there is an entry for the sequence, Method A~Method Y 906 and Method J~Method A 908. The code completion candidates for the sequence Method A~Method Y are Method B, Method Z, and Method S, ordered from highest probability to lowest probability. Likewise, the code completion candidates for the sequence Method J~Method A are Method S and Method U.

There is a dictionary for the overlapping class 904. There are three keys shown for this dictionary 904: Method A~Method Y 910; Method J~Method A 912; and null~Method X 914. For the sequence Method A~Method Y 910, there are two candidates, Method NN and Method LN. For the sequence Method J~Method A 912, there are two candidates, Method ST, Method DY. When there is only one preceding method invocation for a class in a document, a null value is used to represent the missing method invocation and the key is the method sequence NULL, Method X 914. The corresponding entry is Method PL.

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 10:
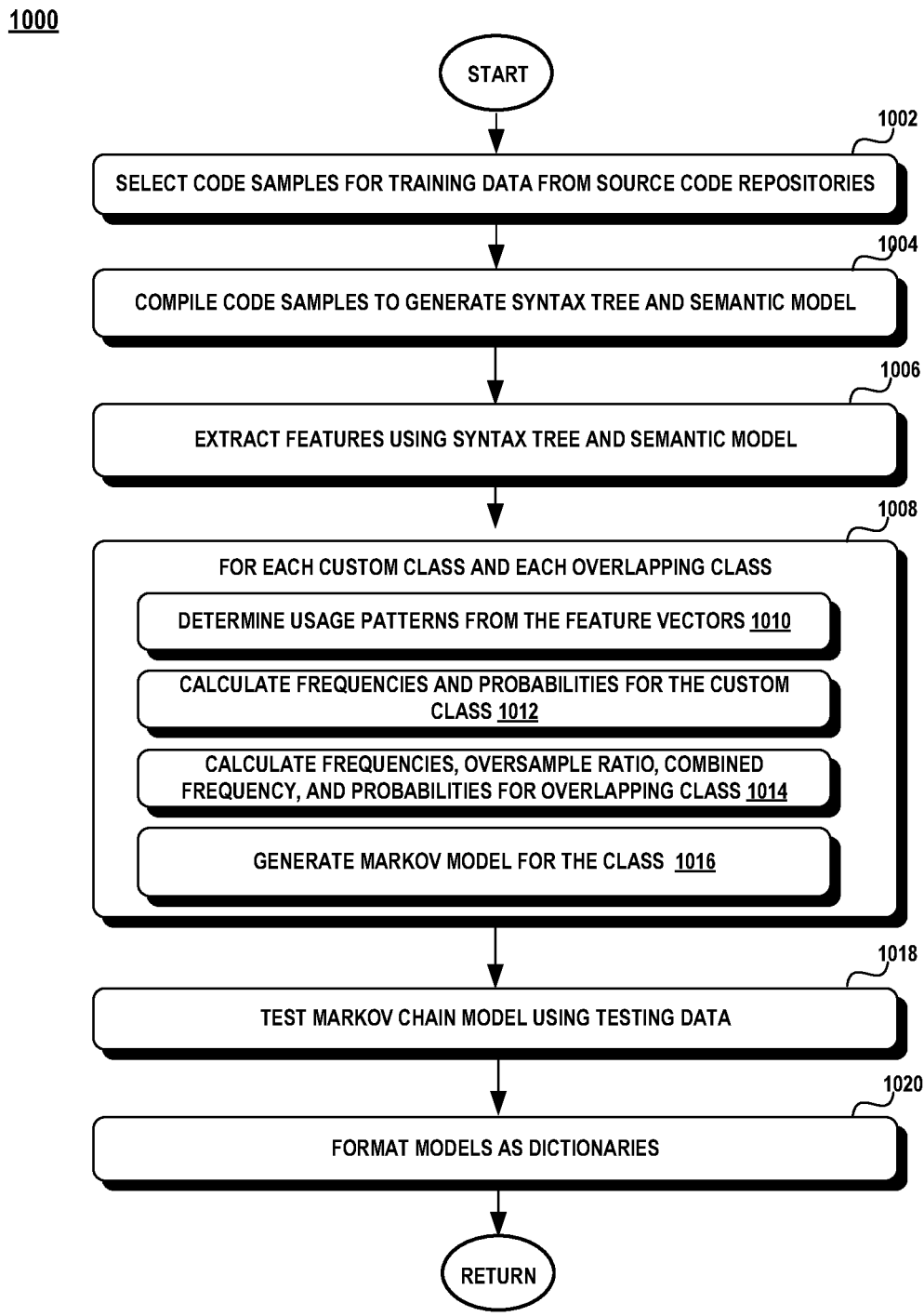
FIG. 10 is a flow diagram illustrating an exemplary method for generating the custom and overloading class models.

Turning to FIG. 10, there is shown an exemplary method 1000 for generating the custom class models and the overlapping class models. Code samples or programs are selected to generate the training data for the custom class models and the overlapping class models. For the custom class models, source code programs using the custom classes are selected. For the overlapping class models, source code programs using the custom classes (custom library) and the standard classes (standard library) are selected (block 1002). Each source code sample is compiled to generate a corresponding syntax tree and semantic model (block 1004). The feature extraction component extracts the features from each source code sample using its syntax tree and semantic model (block 1006).

For each custom and overlapping class, a respective n-order Markov model is generated (block 1008). The data in the feature vectors is used to determine an order of the method invocations in each program for each class. From the ordered list of method invocations, sequences of method invocations with a same class are detected. These patterns can then be partitioned into sequences having n+1 states, where n is the order of the Markov chain model and each state is a method invocation in the same class.

A Markov chain model relies on the assumption that each state is dependent on previous states. The dependency is given by a conditional probability $P(x_t|x_{t-1}, \ldots, x_{t-N})$, where $x_t$ is the state of the model at time t and n is the order of the Markov chain. In a first-order Markov chain, a state is dependent only on the immediately preceding state and in a second-order Markov chain model, a state is dependent on the immediately preceding two states.

The transition probabilities are generated from the sequential usage patterns detected in the training data. For a second-order Markov model, the probabilities may be computed as $P(x_t|x_{t-1}, \ldots, x_{t-2})=N_t/N_{total}$, where $N_t$ is the number of times $x_t$ comes after $x_{t-1}$ and $x_{t-2}$ and $N_{total}$=total number of methods that come after $x_{t-1}$ and $x_{t-2}$.

For each of the custom classes, the transition probability is computed as the ratio of the number of times the n+1 state sequence occurs over the number of times the n state sequence occurs (block 1012).

For each of the overlapping classes, the probability is based on a combined frequency that is the sum of the frequency of the sequence in the training data that uses the standard classes and the frequency of the sequence in the training data that uses the custom classes weighted by an oversample ratio. The oversample ratio is based on the ratio of the frequency of the sequence in the training data using only the standard classes over the frequency of the sequence in the training data using the custom classes.

The combined frequency is represented mathematically as follows (block 1014):

$$P(x_t|x_{t-1},\ldots,x_{t-2}) = N_t/N_{total} + [(M_t/M_{total})*\text{oversample ratio}],$$

where $N_t$ is the number of times $x_t$ comes after $x_{t-1}$ and $x_{t-2}$ in the training data that only uses the standard classes, $N_{total}$=total number of methods that come after $x_{t-1}$ and $x_{t-2}$ in the training data that only uses the standard classes, where $M_t$ is the number of times $x_t$ comes after $x_{t-1}$ and $x_{t-2}$ in the training data that uses the custom classes, $M_{total}$=total number of methods that come after $x_{t-1}$ and $x_{t-2}$ in the training data that uses the custom classes, and $$\text{oversample ratio} = \text{Max}\left(1, \frac{\text{total frequency of } n+1 \text{ state in training data using only standard classes}}{\text{frequency of } n+1 \text{ state in training data using custom classes}}\right).$$

A Markov model is then generated for each class (block 1016). The models are then tested to ensure a target level of accuracy using a certain number of feature vectors (block 1018). The testing entails providing each model with test data and checking the recommendations that the model outputs. When the recommendations achieve a certain level of accuracy, then the models are transformed into a dictionary or lookup table format and released (block 1020).

Once the custom class models and overlapping models are generated, the models are used in a code completion system. FIG. 4 describes an exemplary method of the use of the custom and overlapping models in a code completion system. Referring to FIGS. 4 and 8, code completion is performed in a development environment such as a source code editor 802. The source code editor 802 is configured to interact with an auto completion component 808 that utilizes the machine learning models in a lookup table format (block 402). The source code editor 802 performs a background parsing process that parses the source code in the source code editor to generate and update the syntax tree and semantic model of the source code (block 402).

The user interface 804 of the source code editor 802 detects the input characters that a developer enters into the source code editor 802. When the user interface 804 detects a particular character that denotes code completion is needed for a method invocation at a current position in the source code editor 802, the user interface 804 requests recommendations 814 from the auto completion component 808 (block 404).

The auto completion component 808 utilizes the syntax tree and semantic model 812 generated during the source code editing session to obtain the previous method invocations that have occurred before the current position in the source code editor 802 and the characteristics of the context of the current method invocation (block 406). In one aspect, application program interfaces (APIs) may be used to extract the previous method invocations from the syntax tree and semantic model and the characteristics of the context of the current position (block 406).

The auto completion component 808 utilizes the dictionary 810 associated with the class to search for a sequence most likely to predict the next method invocation using the characteristics of the context of the current position (block 408). Once the auto completion component 808 obtains the previous method invocations, an n-state sequence can be constructed and used as a key to access the dictionary. The corresponding values are used as the recommendations. If there is no such n-state sequence, then the dictionary is searched using an n−1 state sequence constructed from the previous n−1 method invocations in the same class. If the n−1 state sequence cannot be found in the dictionary, then the n−2 state sequence is used to search the dictionary. In an n-order Markov chain model, the n−1 state sequence will be stored as a new n state sequence with the first state marked as null.

The auto completion component 808 may find one or more candidates for recommendation from the sequences in the dictionary (block 408). In the event that there are multiple candidates, the auto completion component 808 orders the recommendations by highest probability (block 410). The candidates are then returned to the user interface for display to the developer (block 412).

Technical Effect

Aspects of the subject matter disclosed herein pertain to the technical problem of providing more precise candidates for code completion. The technical feature associated with addressing this problem involves an n-order Markov chain model that predicts a method for completion of a method invocation. The Markov chain model is trained using sequences of usage patterns of historical method invocations from a sampled population of existing source code programs. Characteristics of the context in which a method is invoked is extracted from the sampled programs in order to recognize sequential patterns in the usage of a method invocation. These characteristics serve as the training data which trains the Markov chain model to more particularly predict a method to complete a method invocation. In this manner, the source code editor presents more relevant candidates for code completion.

Exemplary Operating Environment

Figure 6:
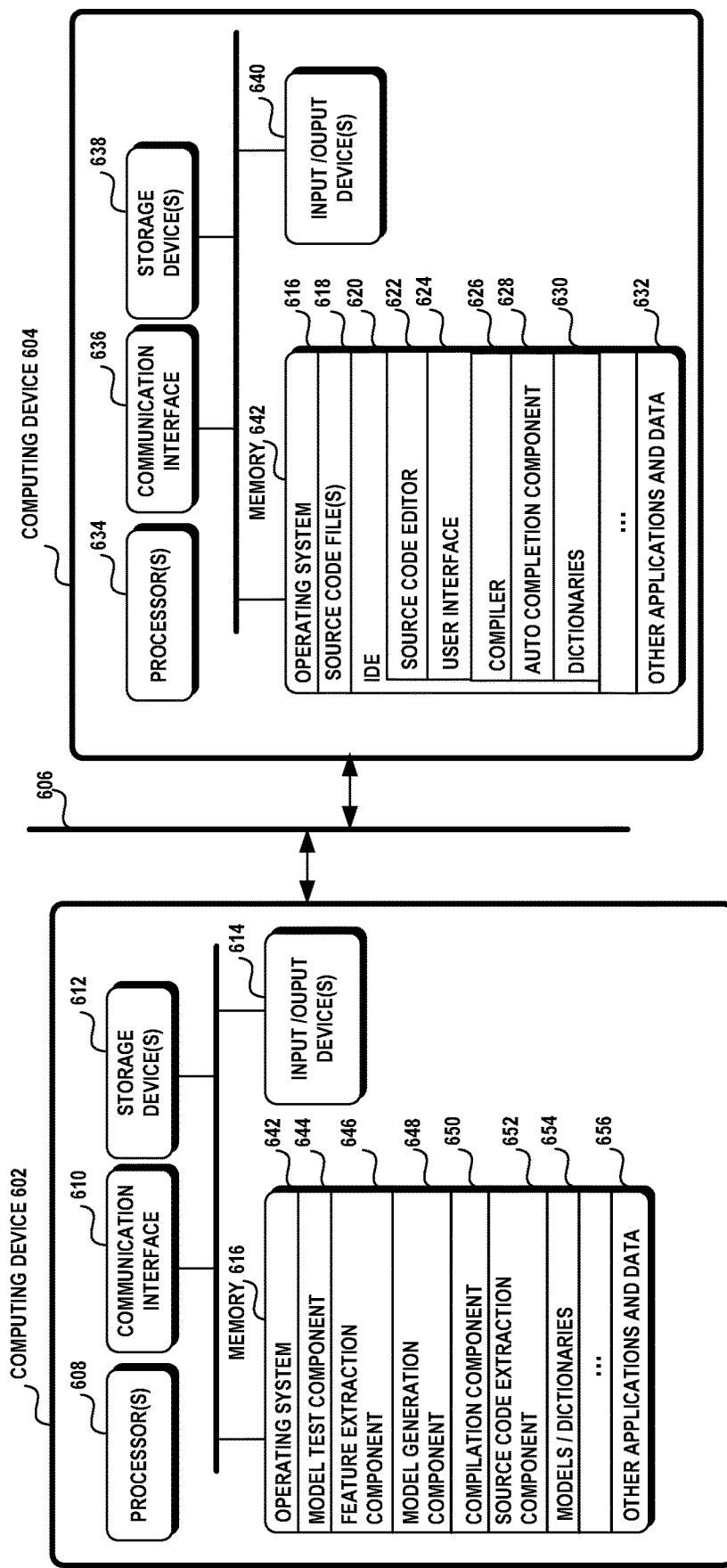
FIG. 6 is a block diagram illustrating an operating environment.

Attention now turns to a discussion of an exemplary operating environment. FIG. 6 illustrates an exemplary operating environment 600 in which a first computing device 602 is used to train the machine learning models and a second computing device 604 uses the machine learning models for code completion. However, it should be noted that the aspects disclosed herein is not constrained to any particular configuration of devices. Computing device 602 may utilize the machine learning models in its own code completion system and computing device 604 may generate and test machine learning models as well. Computing device 602 may be configured as a cloud service that generates machine learning model as a service for other code completion systems. The operating environment is not limited to any particular configuration.

The computing devices 602, 604 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 600 may be configured in a network environment, a distributed environment, a multi-processor environment, or a stand-alone computing device having access to remote or local storage devices.

The computing devices 602, 604 may include one or more processors 608, 634, a communication interface 610, 636, one or more storage devices 612, 638, one or more input/output devices 614, 640, and a memory 616, 642. A processor 608, 634 may be any commercially available or customized processor and may include dual microprocessors and multi-processor architectures. The communication interface 610, 636 facilitates wired or wireless communications between the computing device 602, 604 and other devices. A storage device 612, 638 may be computer-readable medium that does not contain propagating signals, such as modulated data signals transmitted through a carrier wave. Examples of a storage device 612, 638 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 612, 638 in the computing devices 602, 604. The input/output devices 614, 640 may include a keyboard, mouse, pen, voice input device, touch input device, display, speakers, printers, etc., and any combination thereof.

A memory 616, 642 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 616, 642 may also include one or more external storage devices or remotely located storage devices that do not pertain to propagated signals, such as modulated data signals transmitted through a carrier wave.

Computing device 604 may utilize an integrated development environment (IDE) 620 that allows a user (e.g., developer, programmer, designer, coder, etc.) to design, code, compile, test, run, edit, debug or build a program, set of programs, web sites, web applications, and web services in a computer system. Software programs can include source code files 618, created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 620 may provide a native code development environment or may provide a managed code development that runs on a virtual machine or may provide a combination thereof. The IDE 620 may provide a managed code development environment using the .NET framework. It should be noted that this operating embodiment is not constrained to providing the source code development services through an IDE and that other tools may be utilized instead, such as a stand-alone source code editor and the like.

A user can create and/or edit the source code files 618 according to known software programming techniques and the specific logical and syntactical rules associated with a particular source language via a user interface 624 and a source code editor 622 in the IDE 620. Thereafter, the source code files 618 can be compiled via a compiler 626, such as a front end or language compiler. During this compilation process, the front-end compiler 626 generates data structures representing the syntactic structure and semantic model of the source code.

The memory 642 may contain instructions, components, and data. A component is a software program that performs a specific function and is otherwise known as a module, program, and/or application. The memory 642 may include an operating system 616, one or more source code files 618, an IDE that may include a source code editor 622, a user interface 624, a compiler 626, an autocompletion component 628, dictionaries 630 and other applications and data 632. Memory 616 may include an operating system 642, a model test component 644, a feature extraction component 646, a model generation component 648, a compilation component 650, a source code extraction component 652, models/dictionaries 654, and other applications and data 656.

The computing devices 602, 604 may be communicatively coupled via a network 606. The network 634 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 634 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

A system is disclosed that contains one or more processors, a memory and one or more programs, where the one or more programs are stored in memory. The one or more programs are configured to be executed by the one or more processors and have instructions for generating a data structure representing a syntactic structure and a semantic model of a program, extracting a plurality of features from the data structure to construct one or more feature vectors, the plurality of features including characteristics of a context of a method invocation found within a program, and training a sequential model for a first class from the one or more feature vectors to predict a next method invocation for code completion following one or more preceding method invocations of a same class as the first class, wherein the sequential model includes one or more sequences of method invocations with probabilities for transitioning between each method invocation in the one or more sequences.

The sequential model may be an n-order Markov chain model. The data structure includes a syntax tree and a semantic model and is generated from compilation of the program. The characteristics of a context of a method invocation includes one or more of a spatial position of a method invocation, a name of a class associated with a method invocation, a name of a method or property invoked, and a name of a function containing a method invocation. The characteristics of a context of a method invocation may also include whether a method invocation is included in a conditional branch and identifiers indicating whether a method invocation is associated with an override, static, virtual, definition, abstract, and/or sealed keyword.

A device is disclosed that includes at least one processor and a memory. The device is configured to extract one or more features from a plurality of source code programs where a source code program has one or more method calls. The features represent a context in which a method is called in the source code program and at least one feature represents a location of the called method in the program. The device is further configured to generate one or more sequences of method calls of length n from the extracted one or more features. A sequence includes method calls occurring in successive order. A sequence includes a probability from transitioning from one method in a sequence to an immediately succeeding method in the sequence, wherein the sequences and probabilities are computed from usage patterns of historical source code programs. The device is further configured to train sequences to predict a method to complete a method invocation in a program using a context of the method invocation and at least one immediately preceding method invocation.

A sequence of method calls of length n are represented as an n-order Markov chain model. The features may include a name of a class associated with a method invocation, a name of a method or property invoked, a name of a function containing a method invocation, an indication of whether a method invocation is included in a conditional branch, and identifiers indicating whether a method invocation is associated with an override, static, virtual, definition, abstract, and/or sealed keyword. The features are extracted from a syntax tree and/or semantic model representation of the plurality of source code programs. The syntax tree and semantic model representation of a source code program is generated from a compilation of a source code program.

A method is disclosed that can implemented on a system or device disclosed herein which obtains at least one method invocation in a source code program occurring immediately preceding a current position in a source code editor, determines a class associated with input at the current position, utilizes a Markov chain model to predict one or more recommendations of methods to complete a method invocation at the current position, and produces the one or more predicted recommendations of methods using the Markov chain model using the at least one previous method invocation in the source code program and characteristics of a context at the current position.

The Markov chain model includes one or more sequences of method invocations where a sequence includes transition probabilities representing a likelihood of transitioning from one method invocation to another method invocation in a sequence. The method generates a data structure that tracks a syntax structure and semantic model of the source code program in the source code editor and uses the data structure to obtain the at least one previous method invocation in a source code program occurring immediately preceding the current position. The method uses the data structure to obtain the characteristics of the context of the current position. The method ranks the one or more predicted code completion recommendations in order of highest probability.

A system is disclosed that comprises at least one processor, a memory, and at least one program configured to be executed by the one or more processors. The at least one program including instructions that: train a first sequential model for at least one custom class with features from a plurality of source code programs using methods associated with the at least one custom class, the at least one custom class associated with a custom library of classes for a programming language that differs from a standard library of classes for the programming language, the first sequential model including a sequence of n custom method invocations, at least one custom candidate method succeeding the sequence of n custom method invocations, and a probability that the at least one custom candidate method succeeds the sequence of n custom method invocations; train a second sequential model for at least one overlapping class with features from a plurality of source code programs using methods associated with the at least one overlapping class, the at least one overlapping class associated with a standard library of classes for the programming language that are present in the custom library, the second sequential model including a sequence of n overlapping method invocations, at least one overlapping candidate method succeeding the sequence of n overlapping method invocations, and a probability that the at least one overlapping candidate method succeeds the sequence of n overlapping method invocations; and employ the first sequential model and the second sequential model in a code completion system to provide at least one candidate to complete a method invocation for a source code program having the custom class.

The first sequential model and the second sequential model are n-order Markov chain models. The probability that at least one overlapping candidate method succeeds the sequence of n overlapping method invocations is based on a combined frequency derived from training data using only the standard library of classes and training data using the custom library of classes. The probability that the at least one overlapping candidate method succeeds the sequence of n overlapping method invocations is based on a combined frequency derived from a frequency of the overlapping candidate method in a sequence in training data using only standard classes and a frequency of the overlapping candidate method in a sequence in training data using custom classes.

The frequency of the overlapping candidate method in the sequence in training data using custom classes is weighted by an oversample ratio. The oversample ratio is based on a ratio of a total frequency of the overlapping candidate method in the sequence in training data using standard classes over the frequency of the overlapping candidate method in the sequence in training data using custom classes.

The probability that a custom candidate method succeeds the sequence of n custom method invocations is based on a frequency of the custom candidate method occurring in a sequence in training data using custom classes over a frequency of other methods in the class occurring after the sequence in training data using custom classes. The candidates are rank based on highest probability.

A third sequential model may be generated for at least one standard class with features from a plurality of source code programs using methods associated with the at least one standard class, the first sequential model including a sequence of n standard method invocations, at least one standard candidate method succeeding the sequence of n custom method invocations, and a probability that the at least one standard candidate method succeeds the sequence of n custom method invocations. The third sequential model is placed into the code completion system along with the first and second sequential models.

A method is disclosed that performs the actions of generating, on a computing device having at least one processor and a memory, at least one n-state sequence of method invocations of a custom class of a programming language, the n-state sequence of method invocations of the custom class associated with at least one custom-class method candidate; assigning the at least one custom-class method candidate with a probability of succeeding the at least one n-state sequence of method invocations of the custom class; generating at least one n-state sequence of method invocations of an overlapping class of the programming language, the n-state sequence of method invocations of the overlapping class associated with at least one overlapping-class method candidate; assigning the at least one overlapping-class method candidate with a probability of succeeding the at least one n-state sequence of method invocations of the overlapping class; and formatting the at least one n-state sequence of method invocations of the overlapping class and the at least one n-state sequence of method invocations of the custom class for use in a code completion system to predict a method to complete a method invocation. The at least one overlapping class is part of a standard library of classes for the programming language. The at least one custom class is part of a custom library of classes for the programming language, wherein the custom class is not part of the standard library of classes.

The probability of the at least one n+1 state overlapping-class method candidate is based on a combined frequency derived from frequencies of methods of the overlapping class in training data that only uses standard classes and from frequencies of methods of the overlapping class in training data uses the custom classes. The frequencies of methods of the overlapping class in training data the uses custom classes is weighted by an oversample ratio. The oversample ratio is based on a ratio of a total frequency of the at least one overlapping-class method candidate in training data using standard classes over the frequency of the at least one overlapping-class method candidate in training data using custom classes. The at least one n-state sequence of method invocations of a custom class and the at least one custom-class method candidate are represented by an n-order Markov model. The at least one n-state sequence of method invocations of an overlapping class and the at least one overlapping-class method candidate are represented by an n-order Markov model.

The method performs additional actions of extracting features from a plurality of source code programs using classes from the custom library to generate the at least one n-state sequence of method invocations of the custom class; and extracting features from a plurality of source code programs using classes from the standard library and the custom library to generate the at least one n-state sequence of method invocations of the overlapping class.

The method performs additional actions of generating at least one n-state sequence of method invocations of a standard class of the programming language, the n-state sequence of method invocations of the standard class associated with at least one standard-class method candidate; and assigning the at least one standard-class method candidate with a probability of succeeding the at least one n-state sequence of method invocations of the standard class.

The method performs other actions of formatting the at least one n-state sequence of method invocations of the standard class and the at least one standard-class method candidate for use in the code completion system.

The method performs more actions of generating a lookup table including the at least one n-state sequence of method invocations of the overlapping class, the at least one overlapping-class method candidate, the at least one n-state sequence of method invocations of the custom class, the at least one custom-class method candidate, the at least one n-state sequence of method invocations of the standard class, and/or the at least one standard-class method candidate; and employing the lookup table in a code completion system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor and a memory;
   at least one program configured to be executed by the at least one processor, the at least one program including instructions that:
   train a first sequential model for at least one custom class with features from a plurality of source code programs using methods associated with the at least one custom class, the at least one custom class associated with a custom library of classes for a programming language that differs from a standard library of classes for the programming language, the first sequential model including a sequence of n custom method invocations, at least one custom candidate method succeeding the sequence of n custom method invocations, and a probability that the at least one custom candidate method succeeds the sequence of n custom method invocations;
   train a second sequential model for at least one overlapping class with features from a plurality of source code programs using methods associated with the at least one overlapping class, the at least one overlapping class associated with a standard library of classes for the programming language that are present in the custom library, the second sequential model including a sequence of n overlapping method invocations, at least one overlapping candidate method succeeding the sequence of n overlapping method invocations, and a probability that the at least one overlapping candidate method succeeds the sequence of n overlapping method invocations; and
   employ the first sequential model and the second sequential model in a code completion system to provide at least one candidate to complete a method invocation for a source code program having the custom class, wherein the at least one candidate is ranked based on a highest probability.

2. The system of claim 1, wherein the first sequential model and the second sequential model are n-order Markov chain models.

3. The system of claim 1, wherein the probability that at least one overlapping candidate method succeeds the sequence of n overlapping method invocations is based on a combined frequency derived from training data using only the standard library of classes and training data using the custom library of classes.

4. The system of claim 1, wherein the probability that the at least one overlapping candidate method succeeds the sequence of n overlapping method invocations is based on a combined frequency derived from a frequency of the overlapping candidate method in a sequence in training data using only standard classes and a frequency of the overlapping candidate method in a sequence in training data using custom classes.

5. The system of claim 4, wherein the frequency of the overlapping candidate method in the sequence in training data using custom classes is weighted by an oversample ratio.

6. The system of claim 5, wherein the oversample ratio is based on a ratio of a total frequency of the overlapping candidate method in the sequence in training data using standard classes over the frequency of the overlapping candidate method in the sequence in training data using custom classes.

7. The system of claim 1, wherein the probability that a custom candidate method succeeds the sequence of n custom method invocations is based on a frequency of the custom candidate method occurring in a sequence in training data using custom classes over a frequency of other methods in the class occurring after the sequence in training data using custom classes.

8. The system of claim 1, wherein the at least one program includes further instructions that train a third sequential model for at least one standard class with features from a plurality of source code programs using methods associated with the at least one standard class, the first sequential model including a sequence of n standard method invocations, at least one standard candidate method succeeding the sequence of n custom method invocations, and a probability that the at least one standard candidate method succeeds the sequence of n custom method invocations.

9. The system of claim 8, wherein the at least one program includes further instructions that employ the third sequential model into the code completion system.

10. A method, comprising:
generating, on a computing device having at least one processor and a memory, at least one n-state sequence of method invocations of a custom class of a programming language, the n-state sequence of method invocations of the custom class associated with at least one custom-class method candidate, wherein the at least one n-state sequence of method invocations of the custom class are generated from extracting features from a plurality of source code programs using classes from a custom library;
assigning the at least one custom-class method candidate with a probability of succeeding the at least one n-state sequence of method invocations of the custom class;
generating at least one n-state sequence of method invocations of an overlapping class of the programming language, the n-state sequence of method invocations of the overlapping class associated with at least one overlapping-class method candidate, wherein the at least one n-state sequence of method invocations of the overlapping class are generated from extracting features from a plurality of source code programs using classes from a standard library and the custom library;
assigning the at least one overlapping-class method candidate with a probability of succeeding the at least one n-state sequence of method invocations of the overlapping class; and formatting the at least one n-state sequence of method invocations of the overlapping class and the at least one n-state sequence of method invocations of the custom class for use in a code completion system to predict a method to complete a method invocation,
wherein the at least one overlapping class is part of a standard library of classes for the programming language,
wherein the at least one custom class is part of a custom library of classes for the programming language, wherein the custom class is not part of the standard library of classes.

11. The method of claim 10, wherein the probability of the at least one overlapping-class method candidate is based on a combined frequency derived from frequencies of methods of the overlapping class in training data that only uses standard classes and from frequencies of methods of the overlapping class in training data uses the custom classes.

12. The method of claim 11, wherein the frequencies of methods of the overlapping class in training data that uses custom classes is weighted by an oversample ratio.

13. The method of claim 12, wherein the oversample ratio is based on a ratio of a total frequency of the at least one overlapping-class method candidate in training data using standard classes over the frequency of the at least one overlapping-class method candidate in training data using custom classes.

14. The method of claim 10, wherein at least one n-state sequence of method invocations of a custom class and the at least one custom-class method candidate are represented by an n-order Markov model.

15. The method of claim 10, wherein the at least one n-state sequence of method invocations of an overlapping class and the at least one overlapping-class method candidate are represented by an n-order Markov model.

16. The method of claim 10, further comprising:
generating at least one n-state sequence of method invocations of a standard class of the programming language, the n-state sequence of method invocations of the standard class associated with at least one standard-class method candidate;
assigning the at least one standard-class method candidate with a probability of succeeding the at least one n-state sequence of method invocations of the standard class.

17. The method of claim 16, further comprising:
formatting the at least one n-state sequence of method invocations of the standard class and the at least one standard-class method candidate for use in the code completion system.

18. The method of claim 17, further comprising:
generating a lookup table including the at least one n-state sequence of method invocations of the overlapping class, the at least one overlapping-class method candidate, the at least one n-state sequence of method invocations of the custom class, the at least one custom-class method candidate, the at least one n-state sequence of method invocations of the standard class, and/or the at least one standard-class method candidate; and
employing the lookup table in a code completion system.

* * * * *